US008670428B2

(12) United States Patent
Quick, Jr. et al.

(10) Patent No.: US 8,670,428 B2
(45) Date of Patent: Mar. 11, 2014

(54) SIGNAL ACQUISITION IN PEER-TO-PEER COMMUNICATIONS

(75) Inventors: Roy Franklin Quick, Jr., San Diego, CA (US); Henry David Pfister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 948 days.

(21) Appl. No.: 11/080,103

(22) Filed: Mar. 14, 2005

(65) Prior Publication Data

US 2005/0207384 A1 Sep. 22, 2005

Related U.S. Application Data

(60) Provisional application No. 60/554,535, filed on Mar. 18, 2004.

(51) Int. Cl.
*H04B 7/216* (2006.01)

(52) U.S. Cl.
USPC ............................ 370/342; 370/503; 370/371

(58) Field of Classification Search
USPC ................. 370/342, 240.1, 503, 371
See application file for complete search history.

(56) References Cited

U.S. PATENT DOCUMENTS

| 4,081,607 | A | * | 3/1978 | Vitols et al. .................. 704/237 |
| 4,839,890 | A | * | 6/1989 | Semerau et al. ............. 370/503 |
| 4,866,598 | A | * | 9/1989 | Sonnek et al. ............... 710/45 |
| 5,162,988 | A | * | 11/1992 | Semerau et al. ............. 710/105 |
| 6,246,676 | B1 | | 6/2001 | Chen et al. |
| 6,442,152 | B1 | | 8/2002 | Park et al. |
| 6,574,211 | B2 | | 6/2003 | Padovani et al. |
| 6,816,599 | B2 | * | 11/2004 | Thiede et al. ................. 381/314 |
| 6,816,876 | B2 | | 11/2004 | Jha et al. |
| 7,668,257 | B2 | * | 2/2010 | Limberg ....................... 375/301 |
| 7,957,490 | B2 | * | 6/2011 | Limberg ....................... 375/321 |
| 8,111,769 | B2 | * | 2/2012 | Limberg ....................... 375/265 |
| 2002/0090100 | A1 | * | 7/2002 | Thiede et al. ................. 381/314 |
| 2003/0129985 | A1 | | 7/2003 | Naden et al. |
| 2003/0156652 | A1 | * | 8/2003 | Wise et al. ............... 375/240.26 |
| 2003/0182544 | A1 | * | 9/2003 | Wise et al. .................... 712/300 |
| 2003/0196078 | A1 | * | 10/2003 | Wise et al. .................... 712/300 |
| 2003/0227969 | A1 | * | 12/2003 | Wise et al. ................. 375/240.1 |
| 2004/0019775 | A1 | * | 1/2004 | Wise et al. .................... 712/300 |
| 2004/0025000 | A1 | * | 2/2004 | Wise et al. .................... 712/300 |

(Continued)

FOREIGN PATENT DOCUMENTS

| CN | 1302495 | 7/2001 |
| DE | 20315165 | 4/2004 |

(Continued)

OTHER PUBLICATIONS

Garg, Vijay K., *IS-95 CDMA and cdma2000 Cellular/PSC Systems Implementation*, Prentice Hall PTR, 2000, pp. 24-31.

(Continued)

*Primary Examiner* — William D Cumming
(74) *Attorney, Agent, or Firm* — Jeffrey D. Jacobs

(57) ABSTRACT

Methods and mobile stations for transmitting, receiving and processing peer-to-peer communication signals without a base station or network element. A transmitting mobile station may alternate two or more long code masks to generate one or more pseudorandom noise (PN) codes to spread data for transmission. A receiving mobile station receives the spread data and achieves synchronization with the transmitting mobile station.

10 Claims, 13 Drawing Sheets

(56) References Cited

U.S. PATENT DOCUMENTS

| | | | | |
|---|---|---|---|---|
| 2004/0039903 A1* | 2/2004 | Wise et al. | | 712/300 |
| 2004/0221143 A1* | 11/2004 | Wise et al. | | 712/300 |
| 2005/0058234 A1* | 3/2005 | Stojanovic | | 375/371 |
| 2005/0207384 A1* | 9/2005 | Quick et al. | | 370/342 |
| 2006/0280272 A1* | 12/2006 | Stojanovic | | 375/355 |
| 2008/0075201 A1* | 3/2008 | Limberg | | 375/321 |
| 2010/0124287 A1* | 5/2010 | Limberg | | 375/240.27 |

FOREIGN PATENT DOCUMENTS

| | | |
|---|---|---|
| EP | 1726103 | 4/2010 |
| JP | 2002528951 | 9/2002 |
| JP | 2002543666 | 12/2002 |
| JP | 2003289581 | 10/2003 |
| WO | WO 00/65757 | 11/2000 |
| WO | WO 01/55837 A1 | 8/2001 |

OTHER PUBLICATIONS

Lee and Miller, *CDMA Systems Engineering Handbook*, Artech House Publishers, 1998, pp. 543-617.

Yang, Samuel C., *CDMA RF System Engineering*, Artech House Publishers, 1998, pp. 51-58 and 98-99.

New Wave Instruments, "Linear Feedback Shift Registers," www.newwaveinstruments.com/resources/articles, 2002, pp. 1-8.

International Search Report PCT/US2005/008740, International Search Authority European Patent Office Sep. 19, 2005.

International Preliminary Report on Patentability PCT/US2005/008740, International Search Authority US Apr. 15, 2008.

Written Opinion PCT/US2005/008740 International Search Authority European Patent Office Sep. 18, 2006.

European Search Report—EP10160484, Search Authority—Munich Patent Office, May 25, 2010.

European Search Report—EP10182453, Search Authority—Munich Patent Office, Feb. 10, 2012.

European Search Report —EP10182456, Search Authority—Munich Patent Office, Feb. 13, 2012.

European Search Report—EP10182462, Search Authority—Munich Patent Office, Feb. 9, 2012.

European Search Report—EP10182475, Search Authority—Munich Patent Office, Feb. 8, 2012.

Partial European Search Report —EP10160484, Search Authority—The Munich Patent Office—May 25, 2010.

\* cited by examiner

US 8,670,428 B2

SIGNAL ACQUISITION IN PEER-TO-PEER COMMUNICATIONS

CLAIM OF PRIORITY UNDER 35 U.S.C. §119

This application claims priority to co-assigned U.S. Provisional Application No. 60/554,535, entitled "Signal Acquisition in Peer-to-Peer Spread-Spectrum Communications," filed on Mar. 18, 2004, which is incorporated by reference.

BACKGROUND

1. Field

The present application relates to wireless communications. More particularly, the present application relates to a method and apparatus for signal acquisition in peer-to-peer spread-spectrum communications.

2. Background

Mobile devices supporting spread-spectrum technologies, such as Code Division-Multiple Access (CDMA), typically require communication with a cellular base station prior to transmission. In a typical cellular communication, the base station provides a system time value, which may be thought of as an absolute time, to the mobile devices. The mobile devices are then able to use the system time for synchronization and other functions.

For example, normal reverse link communication between a mobile device and a CDMA base station relies on synchronization as follows. The base station uses the known timing of long and short pseudo-random noise (PN) spreading codes to despread received signals from a mobile device. This operation provides processing gain against interference and ensures that the demodulated signal is aligned with frame timing. In addition, the base station uses the known timing of the pseudo-random gating of reverse link transmissions to determine when a signal from a mobile device is present.

BRIEF DESCRIPTION OF THE DRAWINGS

The features, objects, and advantages of the present application will become more apparent from the detailed description set forth below when taken in conjunction with the drawings in which like reference characters identify correspondingly throughout and wherein.

DETAILED DESCRIPTION

Figure 1:
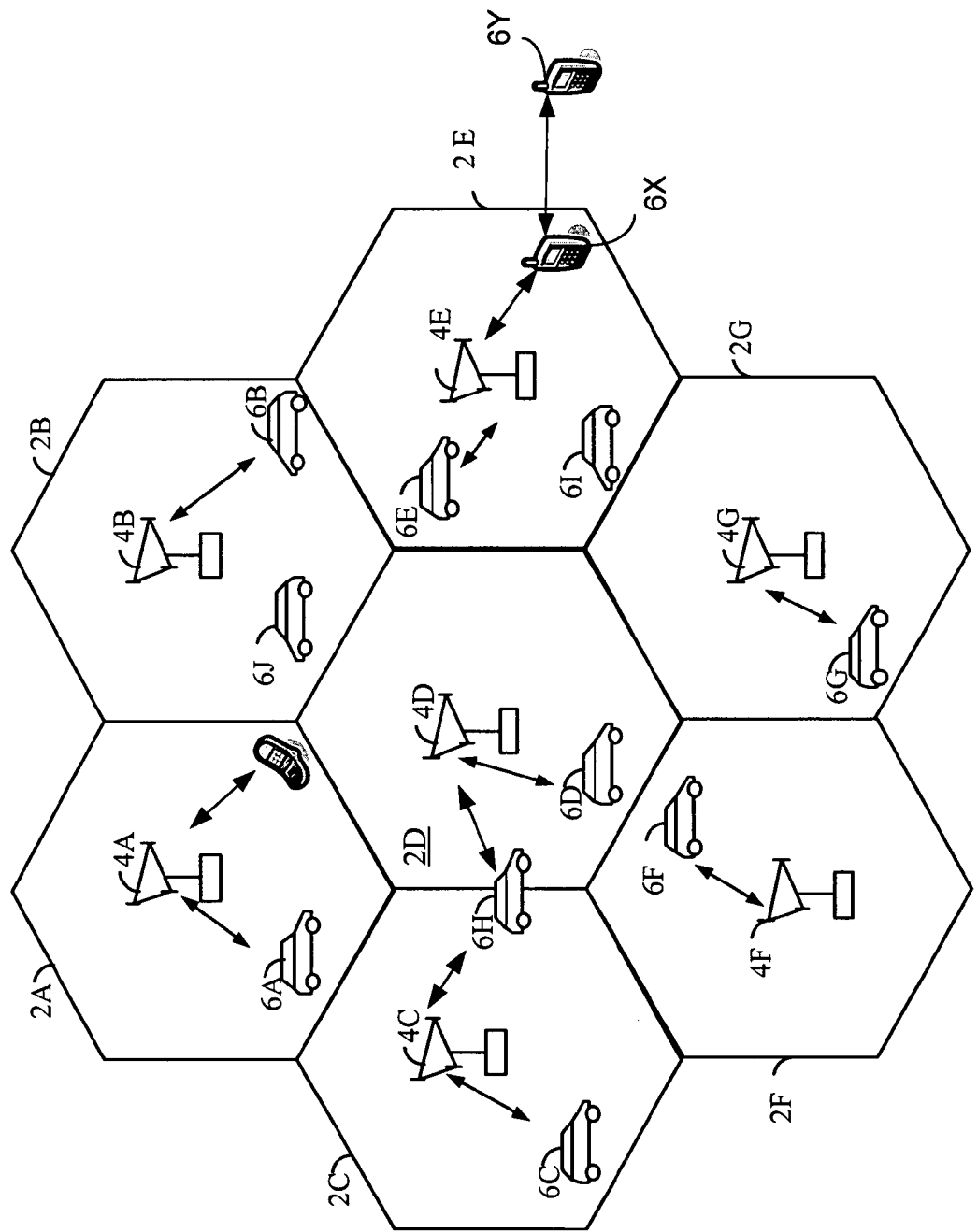
FIG. 1 shows an example of a cellular communication system.

In circumstances where no base station is available, it may be desirable for mobile devices 6X, 6Y (FIG. 1) to communicate directly with each other in a "peer-to-peer" operating mode, i.e., direct communication between mobile devices 6X, 6Y without a network intermediary element. For example, a firefighter may be located inside a building in which base station signals are not available. In order to communicate with other emergency personnel, the firefighter may desire peer-to-peer communication. In another example, a search and rescue team operating in wilderness areas without cellular coverage may also desire peer-to-peer communication.

There may be various ways for a mobile device to enter a peer-to-peer communication mode. For example, a mobile device may detect that there is no viable base station or network element available at the location of the mobile device, e.g., weak base station pilot signal below a pre-determined threshold level for longer than a pre-determined threshold time period, and enter peer-to-peer mode. As another example, a user may command the mobile device to enter peer-to-peer mode. As another example, a base station or another mobile device may send a signal to command the mobile device to enter peer-to-peer mode. One or more of these processes may be combined or selected for a mobile device to enter peer-to-peer mode.

Some studies have identified that peer-to-peer communication should take place in the reverse link, or uplink, frequency range using a modulation format as close as possible to a standard reverse link modulation provided in specific standards, such as CDMA standards, such as Interim Standard 95 (IS-95), Telecommunications Industry Association 2000 (TIA-2000) and TIA/EIA/IS-856 (EIA stands for Electronic Industries Alliance).

A problem with such peer-to-peer communication in the absence of a base station signal is that the peer-to-peer transmitter may lack synchronization with a system time, e.g., a CDMA system time. It is not apparent how the mobile devices 6X, 6Y are able to obtain a system time. In the absence of such timing information, a receiver of a reverse link transmission may have to search a very large space of possible PN timing (e.g., $2^{42}-1$ possible timing hypotheses), which may be impractical, especially when the receiver is a mobile device with less computing power than a typical base station.

Methods and apparatus are described below for obtaining synchronization with reduced search complexity. The methods and apparatuses may also efficiently accommodate movement of mobile devices within a communication system. The methods and apparatuses may be applicable to any communication system where a mobile station may require (or expect to receive) system time information for synchronization but no network element is available. Thus, the methods and apparatuses may support peer-to-peer communications.

The word "exemplary" is used in this application to mean "serving as an example, instance, or illustration." Any embodiment described as an "exemplary embodiment" is not to be construed as necessarily preferred or advantageous over other embodiments described herein.

FIG. 1 shows an example of a cellular communication system comprising multiple cells 2A-2G. Each cell 2 is serviced by at least one corresponding base station 4. The system of FIG. 1 may support TIA-2000 (1×). In another embodiment, the system of FIG. 1 may support High Rate Packet Data (HRPD) or High Data Rate (HDR) communications, wherein a mobile station receives high rate packet data from one base station one at a time, and the base station transmits high rate packet data in a time division multiplex (TDM) manner. Such a system is described in co-assigned U.S. Pat. No. 6,574,211, entitled "Method and Apparatus for High Rate Packet Data Transmission."

Various types of mobile stations 6 (also called remote units, remote stations, remote terminals, access terminals or ATs, mobile devices, mobile units, mobile phones, wireless phones, cellular phones, handheld devices, lap top computers, personal digital assistants (PDAs), etc.) may be dispersed throughout the communication system in FIG. 1. A "mobile station" may also represent a stationary or fixed-location device. Each mobile station 6 receives communication signals from at least one base station 4 on a "forward link" and transmits communication signals to at least one base station 4 on a "reverse link." The mobile stations 6 may include wireless transceivers operated by wireless data service subscribers.

Figure 2A:
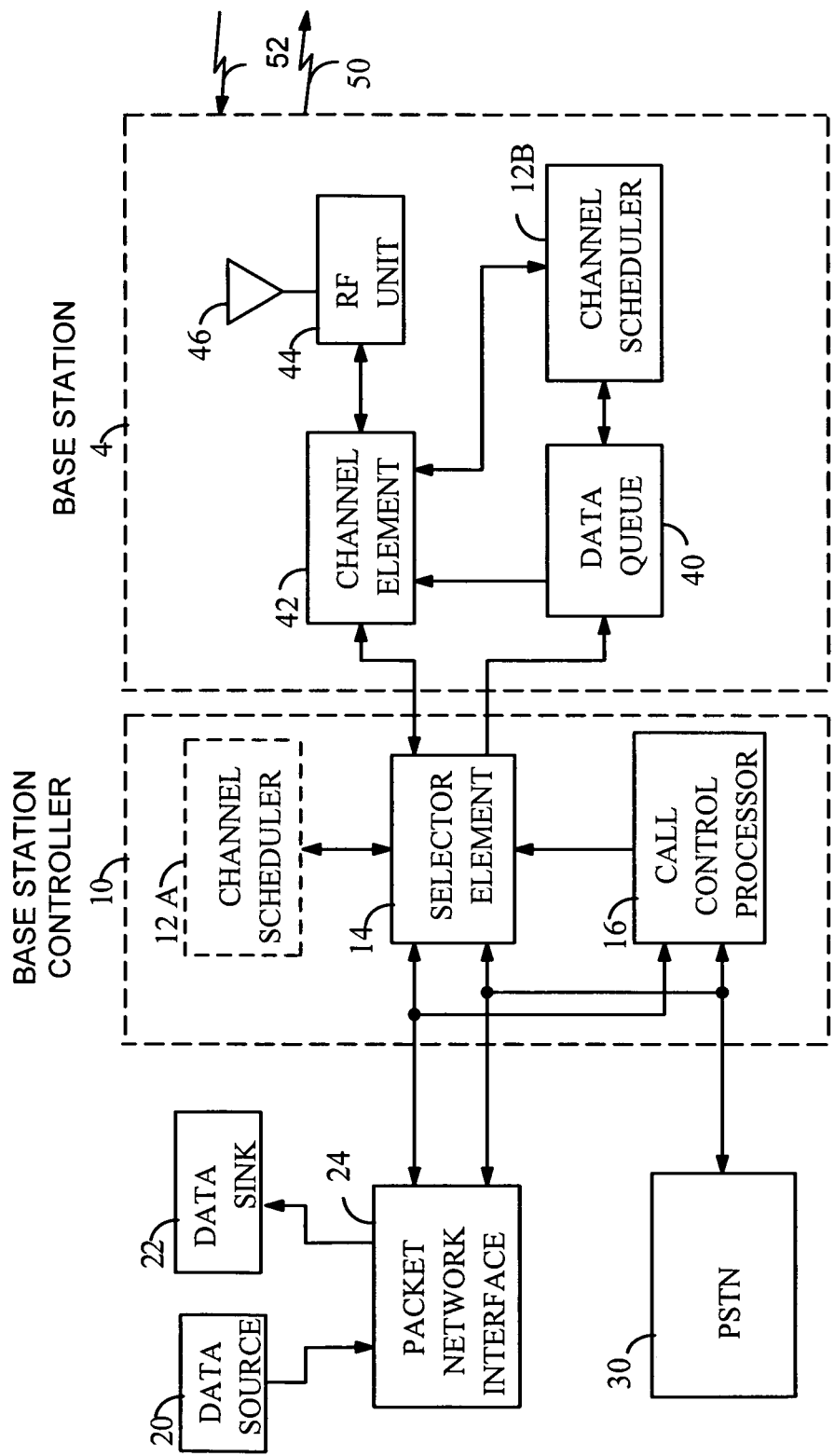
FIG. 2A shows examples of a base station controller and base station apparatus in the communication system of FIG. 1.
Figure 2B:
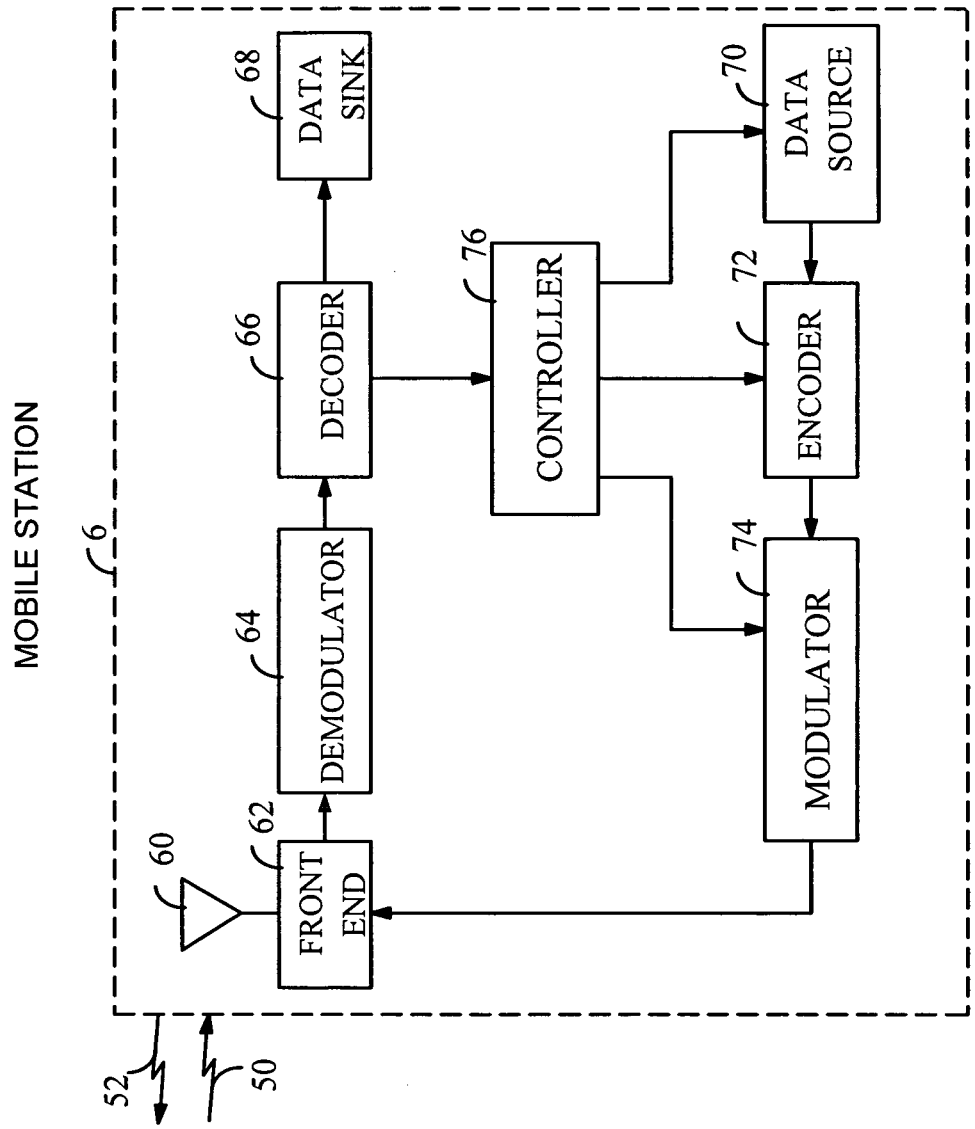
FIG. 2B shows an example of a mobile station in the communication system of FIG. 1.

FIGS. 2A-2B illustrate examples of subsystems of the communication system of FIG. 1. In FIG. 2A, a base station controller 10 interfaces with a packet network interface 24, a Public Switched Telephone Network (PSTN) 30, and all base stations 4 in the communication system (only one base station 4 is shown in FIG. 2A for simplicity). Base station controller 10 coordinates communication between mobile stations 6 in the communication system and other users or applications connected to packet network interface 24 and PSTN 30. PSTN 30 may interface with users through a standard telephone network (not shown in FIG. 2A).

Base station controller 10 may contain many selector elements 14, although only one is shown in FIG. 2A for simplicity. Each selector element 14 is assigned to control communication between one or more base stations 4 and one mobile station 6. If selector element 14 has not been assigned to mobile station 6, call control processor 16 is informed of a need to page mobile station 6. Call control processor 16 may then direct base station 4 to page mobile station 6.

Data source 20 contains a quantity of data, which is to be transmitted to the mobile station 6. Data source 20 provides the data to packet network interface 24. Packet network interface 24 receives the data and routes the data to the selector element 14. Selector element 14 transmits the data to each base station 4 in communication with mobile station 6. In one embodiment, each base station 4 maintains a data queue 40 to store data to be transmitted to the mobile station 6.

The data is transmitted in data packets from data queue 40 to channel element 42. In one embodiment, on the forward link, a "data packet" refers to a quantity of data, which is the maximum of 1024 bits, to be transmitted to a destination mobile station 6 within a "frame" (such as 20 msec) or "time slot" (such as ≈1.667 milliseconds (msec)). For each data packet, channel element 42 may insert related control fields. In one embodiment, channel element 42 encodes the data packet and control fields and inserts a set of code tail bits. The data packet, control fields, cyclic redundancy check (CRC) parity bits, and code tail bits comprise a formatted packet. In one embodiment, channel element 42 encodes the formatted packet and interleaves (or reorders) the symbols within the encoded packet. In one embodiment, the interleaved packet is covered with a Walsh code, and spread with short pseudorandom noise in-phase (PNI) and quadrature (PNQ) codes. The spread data is provided to radio frequency (RF) unit 44, which quadrature modulates, filters, and amplifies the signal. The forward link signal is transmitted over the air through antenna 46 on forward link 50.

FIG. 2B shows an example of a mobile station 6 in the communication system of FIG. 1. Other configurations of the mobile station 6 may be used. In FIG. 2B, the mobile station 6 receives the forward link signal with antenna 60 and routes the signal to a receiver within front end 62. The receiver filters, amplifies, quadrature demodulates, and quantizes the signal. The digitized signal is provided to demodulator 64 where it is despread with the short PNI and PNQ codes and decovered with the Walsh cover. The demodulated data is provided to decoder 66, which performs the inverse of the signal processing functions done at base station 4, specifically the de-interleaving, decoding, and CRC check functions. The decoded data is provided to data sink 68.

A controller 76 in the mobile station 6 in FIG. 2B may control a data source 70, an encoder 72 and a modulator 74 to process data for transmission by a transmitter within the front end 62 via antenna 60.

On a forward link, a base station 4 may transmit to a selected one, or selected ones, of the mobile stations 6 to the exclusion of the remaining mobile stations associated with the base station 4 using a CDMA scheme. At any particular time, the base station 4 may transmit to the selected mobile station(s) 6 by using a code, which is assigned to the receiving base station(s) 4. On a reverse link, each mobile station 6 may transmit to one base station or more than one base station. Each mobile station 6 may be in communication with zero, one or more base stations 4.

Long Codes and Short Codes

Pseudorandom noise (PN) sequences/codes may be generated by a feedback shift register. Two examples of known feedback shift registers include the Fibonacci configuration and the Galois configuration. A set of PN codes may be generated by successively shifting an initial PN code with a set of "offsets."

A PN "long code" is a code with a relatively long length, such as a length of $2^{42}-1$ chips generated by a 42-stage feedback shift register. A PN "short code" is a code with a relatively short length, such as a length of $2^{15}-1$ chips generated by a 15-stage feedback shift register, or a length of $2^{15}$ chips generated by a 15-stage feedback shift register and augmented in length by one chip, as described in TIA-2000. Long codes and short codes may be used for various functions, such as identifying a specific mobile station or certain channels.

PN sequences, long codes, short codes, and masks are further described on pp. 51-58 and 98-99 in "CDMA RF System Engineering" by Samuel C. Yang, 1998, Artech House Publishers; pp. 543-617 in "CDMA Systems Engineering Handbook" by Jhong Sam Lee and Leonard E. Miller, 1998, Artech House Publishers; and pp. 24-31 in "IS-95 CDMA and cdma2000 Cellular/PCS Systems Implementation" by Vijay K. Garg, 2000, Prentice Hall PTR.

Figure 3A:
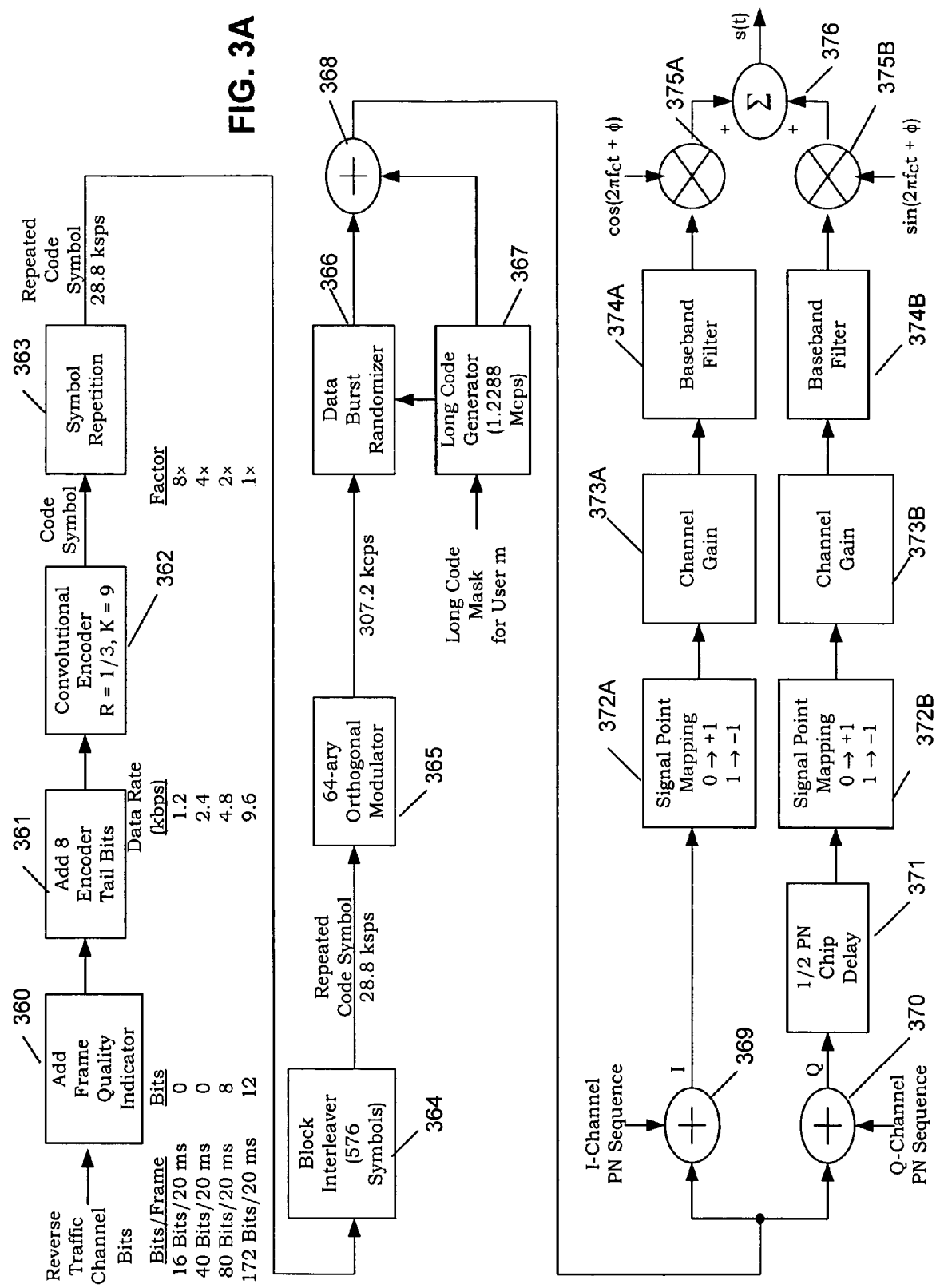
FIG. 3A illustrates an example of a modulator, which may be implemented in the mobile station of FIG. 2B.

FIG. 3A illustrates an example of encoding and modulating elements, which may be implemented in the mobile station 6 of FIG. 2B. The encoding and modulating elements in FIG. 3A may correspond to CDMA2000 Radio Configurations 1 and 2 (RC1 and RC2). The encoding elements and modulating elements may include an element 360 to add a frame quality indicator, an add-8 encoder (tail bits) 361, a convolutional encoder 362, a symbol repeater 363, a block interleaver 364, a 64-ary orthogonal modulator 365, a data burst randomizer 366, a long code generator 367, adders 368-370, a half chip delay 371, signal point mapping elements 372A-372B, channel gain elements 373A-373B, baseband filters 374A-

374B, multipliers 375A-375B and a summer 376. Some of these elements in FIG. 3A share similar functions as elements in FIG. 3B described below.

Figure 3B:
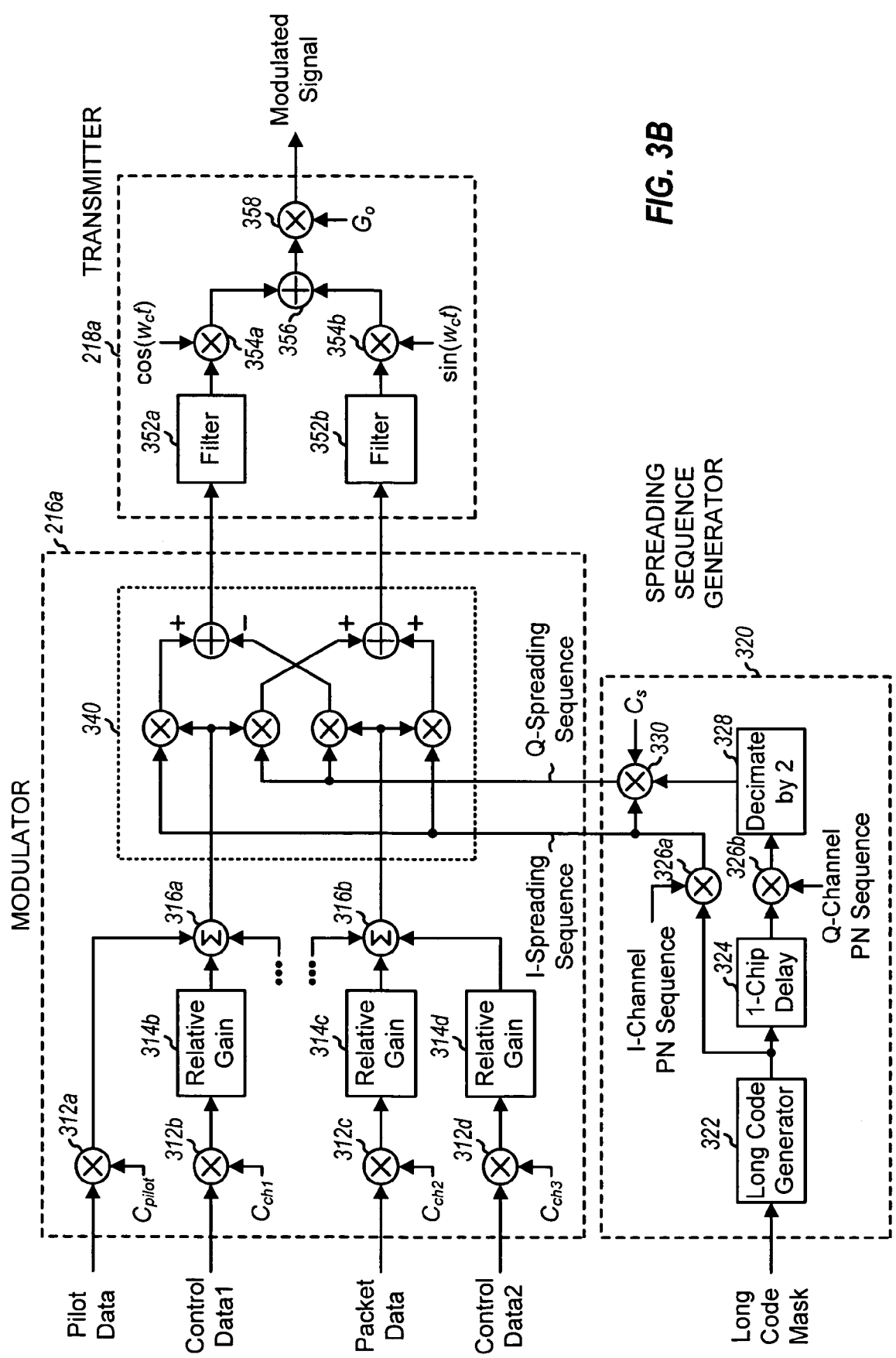
FIG. 3B illustrates another example of a modulator, which may be implemented in the mobile station of FIG. 2B.

FIG. 3B illustrates another example of a modulator 216a, which may be used as the modulator 74 in FIG. 2B. FIG. 3B may be applicable to RC3 and RC4. Other types and configurations of modulators may be used in the mobile station 6 of FIG. 2B. For the reverse link, the modulator 216a covers data for each code channel (e.g., traffic, sync, paging, and pilot channels) with a respective Walsh code, $C_{chx}$ or $C_{pilot}$, by a multiplier 312 to channelize the user-specific data (packet data), messages (control data), and pilot data onto their respective code channels. The channelized data for each code channel may be scaled with a respective gain, $G_i$, by a relative gain unit 314 to control the relative transmit power of the code channels. Scaled data for all code channels for an in-phase (I) path is then summed by a summer 316a to provide I-channel data. Scaled data for all code channels for a quadrature (Q) path is summed by a summer 316b to provide Q-channel data.

FIG. 3B also shows an embodiment of a spreading sequence generator 320 for the reverse link. The spreading sequence generator 320 uses one long PN code and two short PN codes to spread encoded symbols into chips before transmission. Specifically, a long code generator 322 receives a long code mask assigned to the mobile station and generates a long PN sequence with a phase determined by the long code mask. The long PN sequence is then multiplied with an I-channel PN sequence (short code) by a multiplier 326a to generate an I spreading sequence. The long PN sequence is also delayed by a delay element 324, multiplied with a Q-channel PN sequence (short code) by a multiplier 326b, decimated by a factor of two by element 328, and covered with a Walsh code ($C_s$=+−) and further spread with the I spreading sequence by a multiplier 330 to generate a Q spreading sequence. The I-channel and Q-channel PN sequences form the complex short PN sequence used by all terminals. The I and Q spreading sequences form the complex spreading sequence, $S_k$, that is specific to the mobile station. Elements 326a and 326b in FIG. 3B are "multiply" if the input chips have been converted to 1 and −1. Alternatively, elements 326a and 326b in FIG. 3B are "exclusive-OR" (XOR) if the input chips are 0 and 1.

Within modulator 216a, the I-channel data and the Q-channel data ($D_{chI}$+$jD_{chQ}$) are spread with the I and Q spreading sequences ($S_{kI}$+$jS_{kQ}$), via a complex multiply operation performed by a multiplier 340, to generate I spread data and Q spread data ($D_{spI}$+$jD_{spQ}$). The complex despreading operation may be expressed as:

$$D_{spI} + jD_{spQ} = (D_{chI} + jD_{chQ}) \cdot (S_{kI} + jS_{kQ}), \quad \text{Eq (1)}$$
$$= (D_{chI}S_{kI} - D_{chQ}S_{kQ}) +$$
$$j(D_{chI}S_{kQ} + D_{chQ}S_{kI}).$$

The I and Q spread data comprises the modulated data provided by modulator 216a to a transmitter 218a and conditioned. Transmitter 218a is in the front end 62 in FIG. 2B. The signal conditioning includes filtering the I and Q spread data with filters 352a and 352b, respectively, and upconverting the filtered I and Q data with $\cos(w_c t)$ and $\sin(w_c t)$, respectively, by multipliers 354a and 354b. The I and Q components from multipliers 354a and 354b are then summed by a summer 356 and further amplified with a gain, $G_o$, by a multiplier 358 to generate a reverse link modulated signal.

The present application provides a method for obtaining approximate synchronization by using certain properties of long and short code PN sequences. Some specific properties may include:

(1) PN short codes repeat after every 32,768 chips in some CDMA systems, i.e., short codes have a period of $2^{15}$=32,768 chips. Since the chip rate is 1.2288 Megachips per second (Mcps), the period may be represented in time as 26.667 msec. Alternatively, other short codes with periods less than or greater than 32,768 chips may be used.

(2) The PN long code is a "maximal length sequence," which has the property that the exclusive-OR (XOR) of the sequence with a time-shifted version of itself produces the same sequence with a different time shift (also called phase).

(3) Codes are applied to the transmitted signal by transforming a logical 0 into a gain of 1.0, and logical 1 to a gain of −1.0. The transmitted carrier is multiplied by the resulting gains. Thus, the operation of a logical exclusive-OR of two PN sequences is equivalent to a multiplication of the equivalent gains.

The second property above is exploited by CDMA systems, where each mobile station uses a specific "long code mask" to make the PN sequence timing on the reverse link unique to the mobile station.

Figure 4:
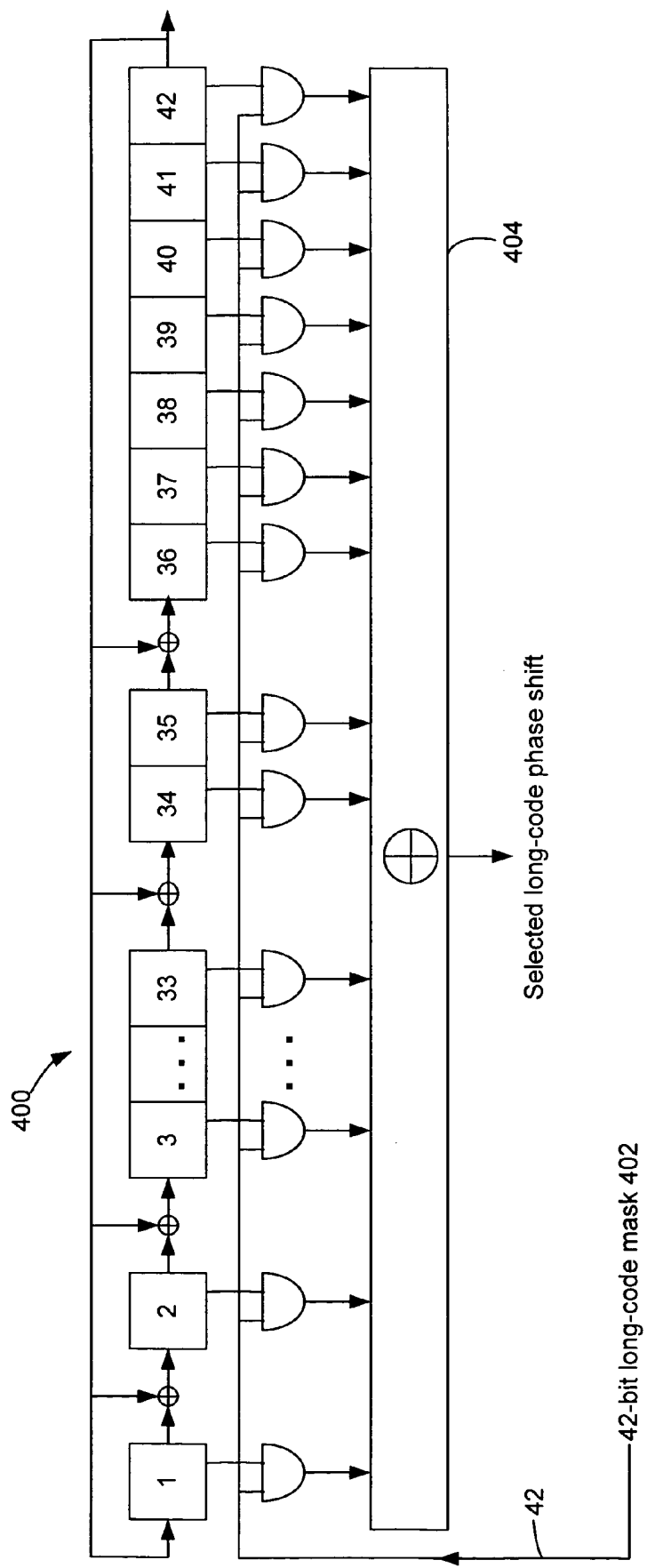
FIG. 4 illustrates an example of a long pseudorandom noise code generator and mask, which may be implemented in the mobile station of FIG. 2B.

FIG. 4 illustrates an example of a long PN code generator 400 and mask 402, which may represent the long code generator 322 and mask in FIG. 3B. Alternatively, other configurations of a long code generator and mask may be used. Each mobile station 6 has a 42-bit long code feedback shift register 400 (i.e., a 42-stage feedback shift register with one or more XOR gates), which produces the same PN sequence (length=$2^{42}$−1 chips) in time synchronization with all other mobile stations and base stations. The feedback shift register may also be called a PN generator or state machine.

Each mobile station uses a specific 42-bit long code "mask" 402 to select a combination of the 42 bits (a combination of outputs of the 42 shift register stages), which are combined by an exclusive-OR 404 to produce the long code PN sequence used to spread data for reverse link transmission. Each value of the long code mask selects a unique time shift (or time offset) of the same long code PN sequence shared by all other mobile stations. For example, a mask may be a function of an identifier associated with the mobile station, such as a Mobile Equipment IDentifier (MEID), an International mobile station identity or International mobile subscriber identity (IMSI) or an Electronic Serial Number (ESN). Assigning each mobile station a unique long code mask ensures that no two mobile stations transmit using a time-synchronized PN sequence.

Short codes (one for the in-phase (I) component and one for the quadrature (Q) component) are combined with the long code by exclusive-OR prior to transmission, as shown in FIG. 3B. The combination of the short and long codes ensures that differences in time delay between two transmitting mobile stations (due to differences in distance to a receiver) do not result in the PN sequences aligning in time. The long codes may align, but the short codes do not. Thus, the code gain is preserved even for very small differences in long code time shifts.

The following description treats the received signal as a stream of complex samples (also called chips) at the PN chip rate. At the start of each reverse link transmission a "preamble" is sent in which all information symbols are forced to zero. This facilitates signal acquisition by the base station or other receiver, since the transmitted signal consists of the PN spreading sequences alone. The preamble can be transmitted at full rate (signal present at all times), which also assists in signal acquisition. Under these conditions, the $i^{th}$ chip of the received signal can be represented as:

$$r_i = L_i(I_i + jQ_i)Ae^{j\phi} + n_i$$

where $L_i$ is the long code equivalent gain, $I_i$ and $Q_i$ are the short code equivalent gains, $Ae^{j\phi}$ is the channel gain and phase, and $n_i$ represents the noise and interference present on the signal. If the long and short code timing is known, the codes can be removed from the received signal by multiplying by the complex conjugate of the code gain terms. Once this is done, the effects of the noise and interference can be reduced by averaging the result over several chips.

If code timing is not known, as in a peer-to-peer communication, some other method would be needed to remove the PN codes in order to detect the presence of the transmitted signal. Relatively simplistic methods such as measuring the received energy could be used, but are too nonspecific to provide useful information about the signal, especially if interferers of a similar type are present. For example, it is possible that the receiver could be in a position where other CDMA transmissions are also detectable. In that case, the signal acquisition method needs to discriminate the transmissions of the desired peer-to-peer mobile station from those of other mobile stations.

Another relatively simple method for signal acquisition is to transmit a known PN sequence at the start of all peer-to-peer transmissions. This could be done by setting the long code register to a known value and using a known long code mask. Since the receiver does not know the timing of the start of transmission, the receiver must continuously search for the initial PN sequence. To allow for the possibility that the start may be missed (due to noise or interference), the receiver should search for multiple offsets of the PN sequence, including some sequences that would occur later than the initial offset.

Following is a description of a method of identifying the presence of a peer-to-peer RC1 or RC2 transmission by using the properties of the long code identified above. In general, the method may be implemented with any spread spectrum communication system in which a long code is used and a short code can be removed by waiting for one or more periods.

Figure 5:
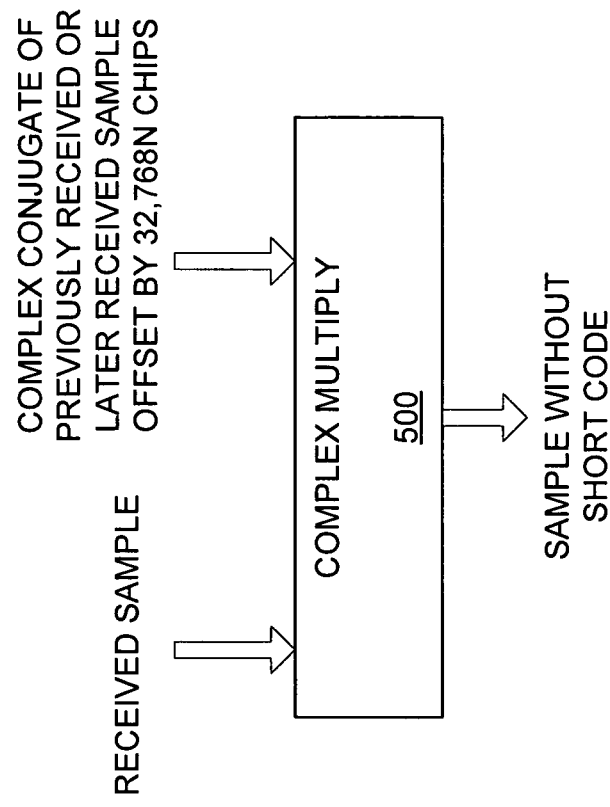
FIG. 5 illustrates a method of removing short codes from a received signal, which may be used by a mobile station of FIG. 1.

First, the problem of a mobile station receiver removing the short codes from a received signal without knowing system timing can be addressed using the periodic nature of short codes, e.g., short codes may repeat every 32,768 chips. FIG. 5 illustrates a method of removing short codes from a received signal, which may be used by mobile station 6Y of FIG. 1. The mobile station multiplies a received signal sample by the complex conjugate of a sample received an integer multiple of 32,768 chips later or previously received to remove the short codes from the signal part (as opposed to noise) of the result. This method works for all CDMA mobile stations, regardless of short code timing.

Next, the long code can be removed by exploiting the shift property of maximal length sequences, as described above. One way to do this is to use the fact that every bit (i.e., chip) of the long code sequence is a linear function of the preceding 42 bits (i.e., chips). 42 bits are used here as an example, but other numbers of bits may be implemented. Thus, multiplying a received signal sample by a properly chosen set of samples from the preceding 42 bits will result in a fixed value in the signal part of the result. This operation, however, is independent of the long code offset being transmitted, and hence provides no discrimination of peer-to-peer mobile stations from ordinary CDMA mobile stations.

Figure 6A:
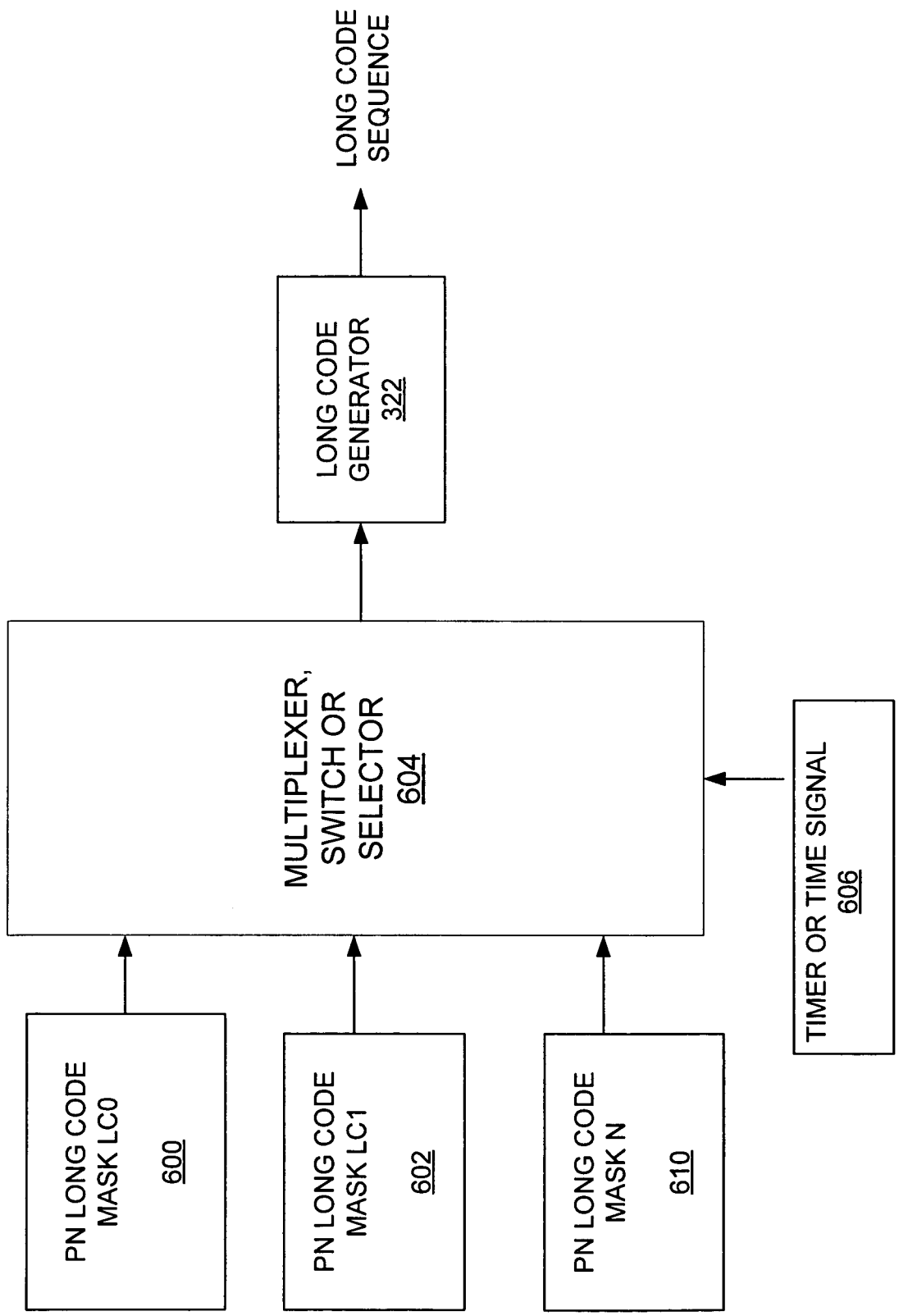
FIG. 6A illustrates a mobile station alternating between two or more long code masks to spread data before peer-to-peer transmission.
Figure 6B:
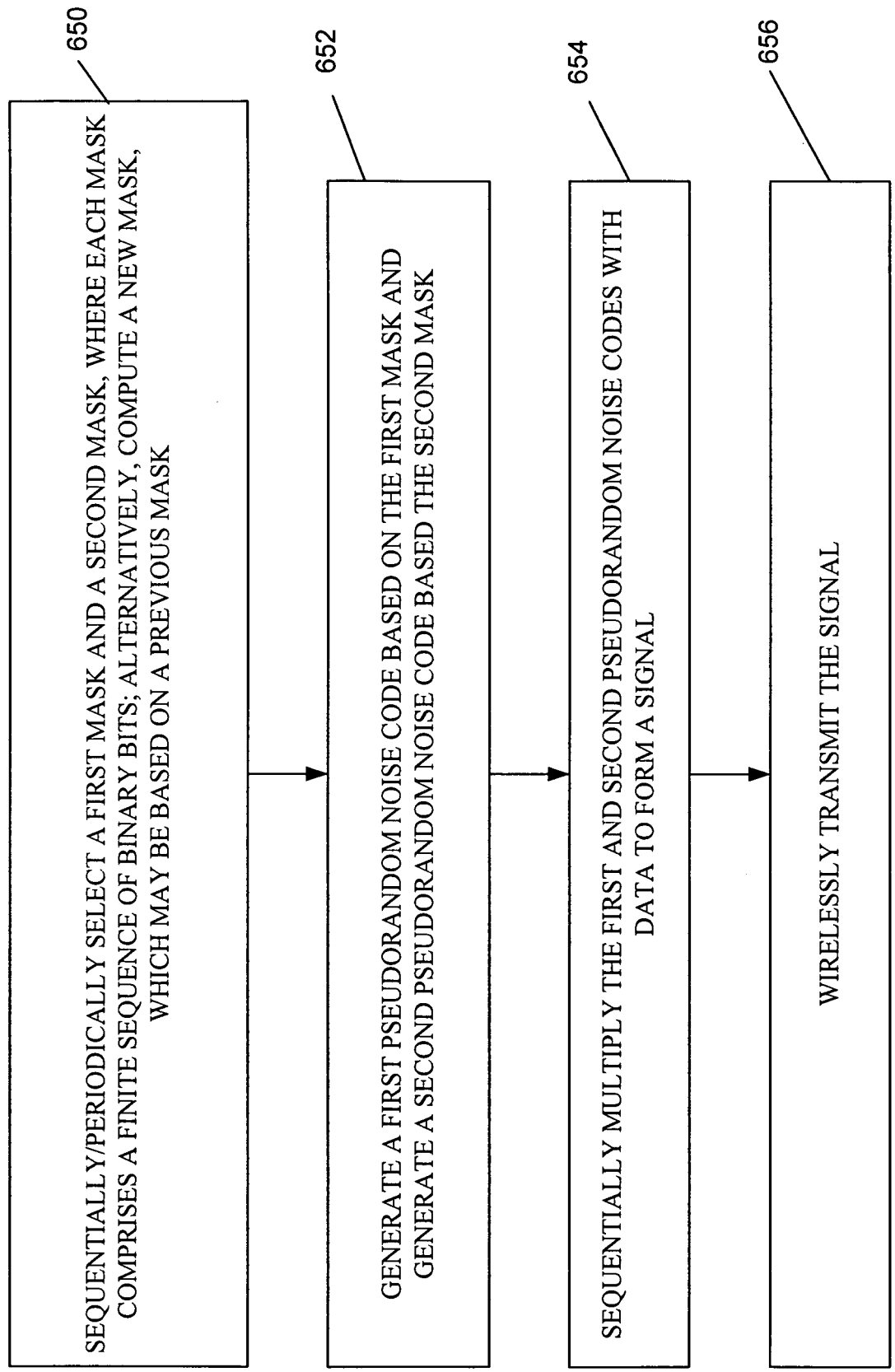
FIG. 6B is a flow chart corresponding to FIG. 6A.
Figure 6C:
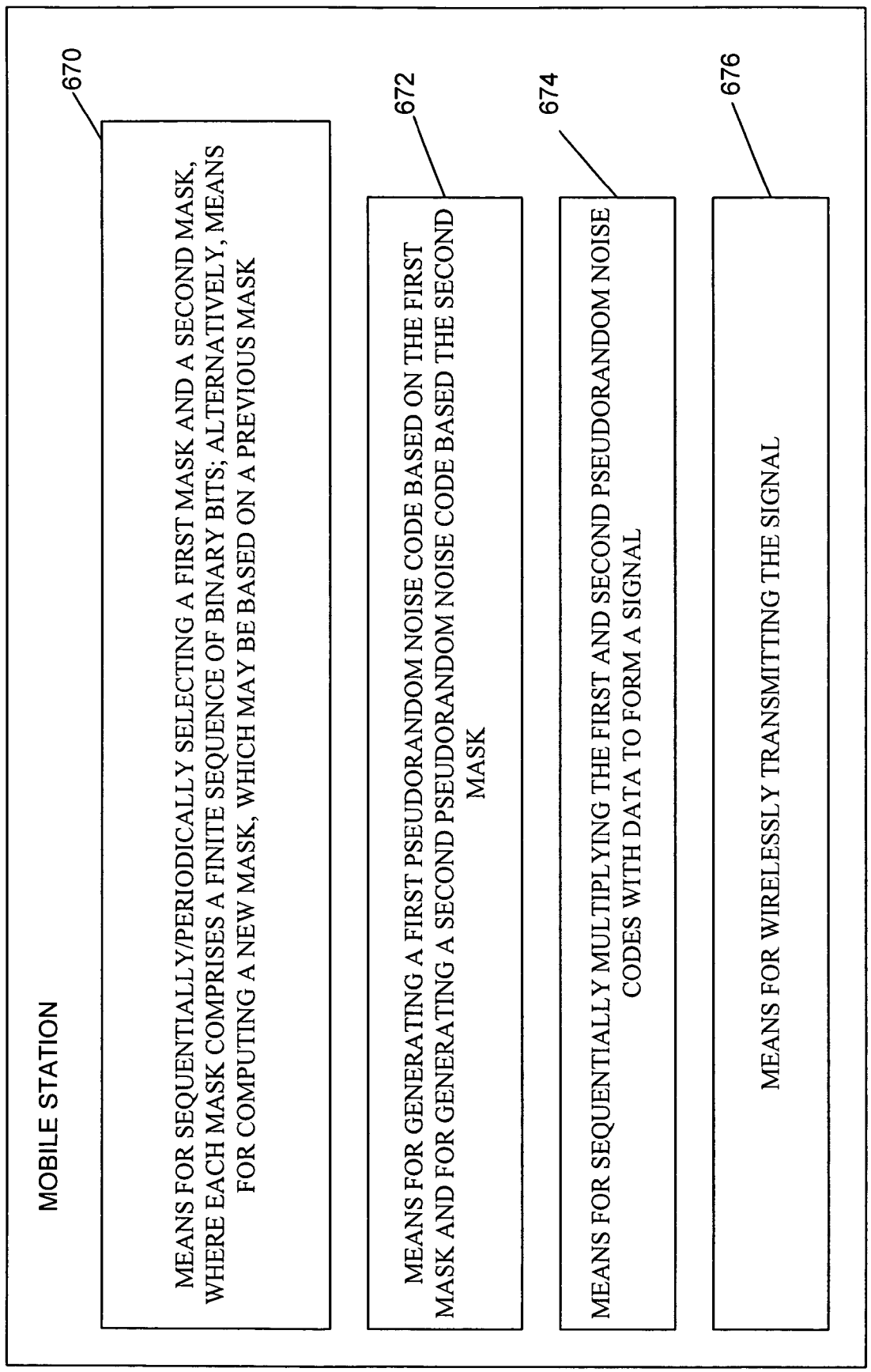
FIG. 6C illustrates a mobile station or apparatus configured to implement the flow chart of FIG. 6B.

To produce a result unique to peer-to-peer mobile stations, peer-to-peer mobile stations 6X, 6Y may perform the following actions:

A) FIGS. 6A-6B illustrate how a mobile station alternates between two or more long code masks 600, 602, 610 to spread data for transmitting in peer-to-peer mode. In FIG. 6A, a multiplexer, switch or selector 604 sequentially (or periodically) selects among two or more long code masks 600, 602, 610 as an output according to a time reference signal or timer 606. In one type of CDMA integrated circuit, the long code mask may be changed every 80 msec, for example. In other types of CDMA integrated circuit, the long code mask may be changed less than or greater than 80 msec. Alternate methods may be used, such as calculating a new mask every 80 msec or reading a mask from a lookup table.

FIG. 6B is a flow chart corresponding to the method described above with FIG. 6A. In block 650, the method sequentially/periodically selects a first mask and a second mask, where each mask comprises a finite sequence of binary bits. Alternatively, the method may compute a new mask, which may be based on a previous mask. In block 652, the method generates a first pseudorandom noise code based on the first mask and generates a second pseudorandom noise code based the second mask. In block 654, the method sequentially multiplies the first and second pseudorandom noise codes with data to form a signal. In block 656, the method wirelessly transmits the signal.

Figure 7A:
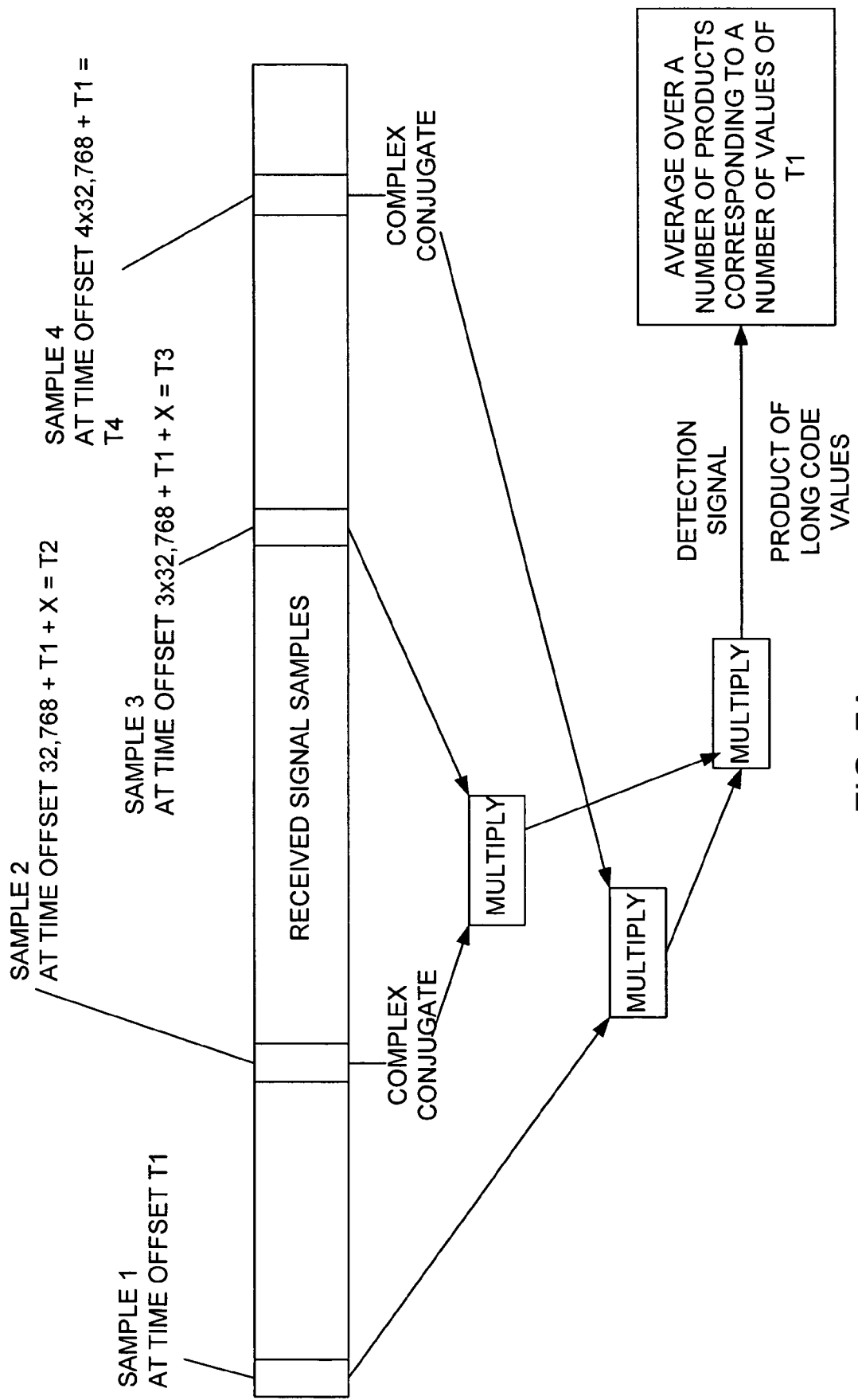
FIG. 7A illustrates a method of a mobile station removing a long code from a received signal.
Figure 7B:
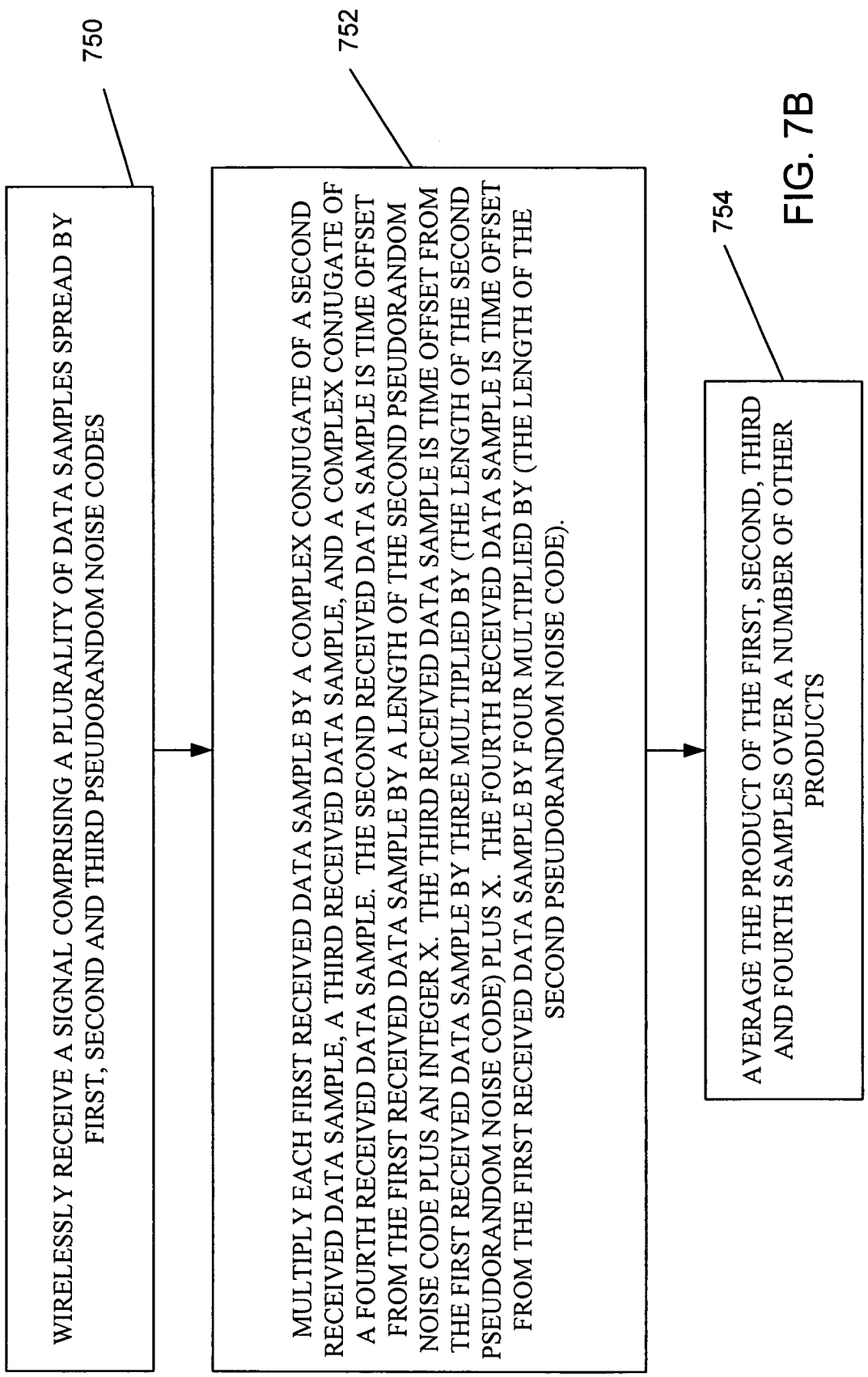
FIG. 7B is a flow chart corresponding to FIG. 7B.
Figure 7C:
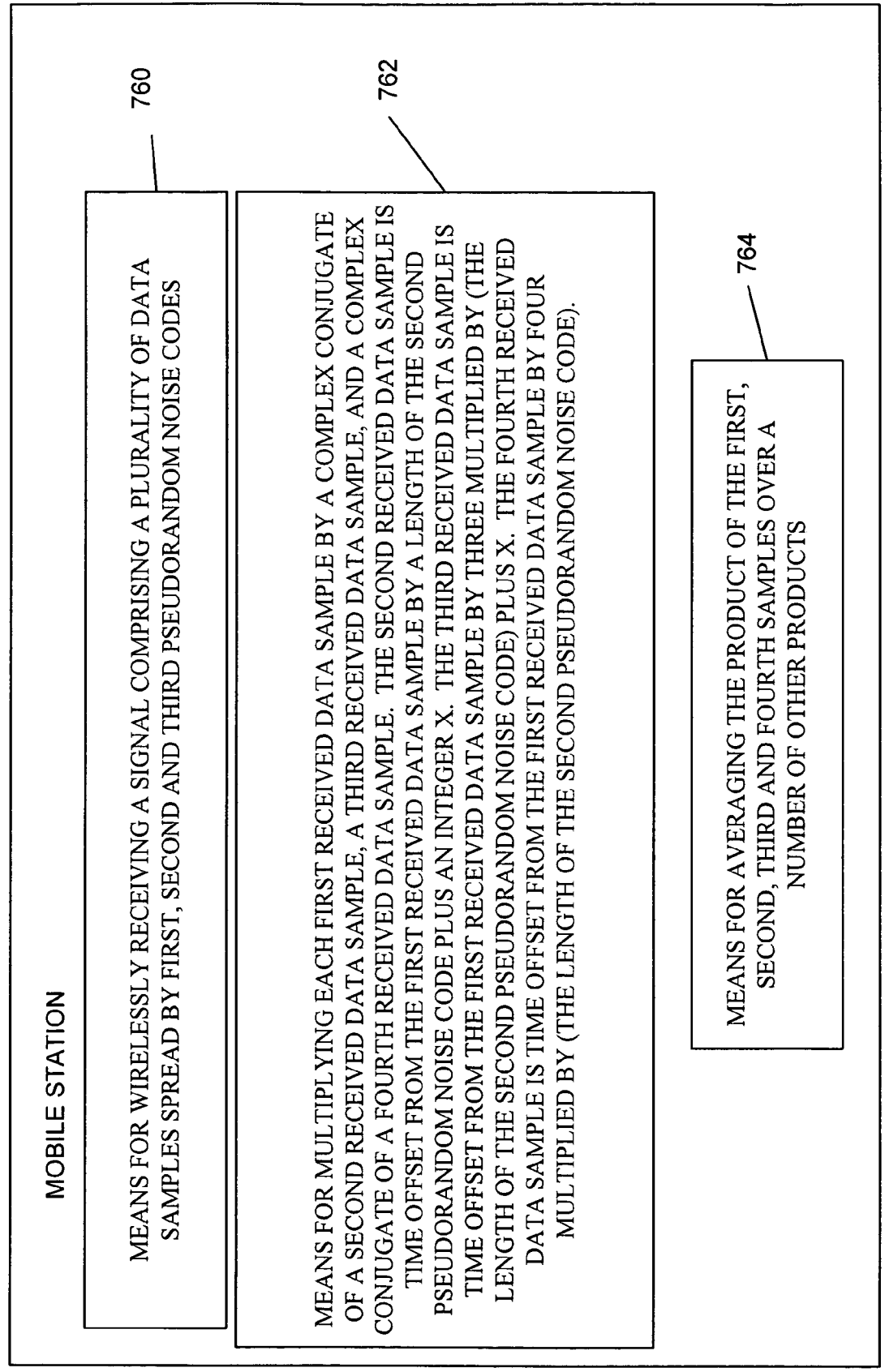
FIG. 7C illustrates a mobile station or apparatus configured to implement the flow chart of FIG. 7B.

B) The receiver (or demodulator 64 in FIG. 2B) of a peer-to-peer mobile station may form a detection signal by multiplying each received signal sample by a set of other received samples, or their complex conjugates, which are received at fixed time offsets from the first sample, as shown in FIGS. 7A-7B and described below. The receiver (or demodulator 64 in FIG. 2B) may then average the result over a large number of signal samples (or chips) to reduce effects of noise and interference. The number of signal samples for the average may be determined by methods known to those skilled in the art. In a typical embodiment, the signal-to-noise ratio is measured or estimated for each signal sample. An average of N samples has a signal-to-noise ratio (power or energy) that is increased by a factor of N. N may be chosen to be sufficiently large that the signal-to-noise ratio of the average provides the desired signal detection characteristics, i.e., a probability of error small enough for reliable operation.

The fixed time offsets for the received samples to be multiplied should be chosen such that the signal part of the result is a constant, and this result occurs only if the transmitter alternates long code masks in a manner consistent with the chosen sample time offsets. This may require some time offsets to be long enough that some of the multiplied samples come from sequences resulting from two or more distinct long code masks.

For any two long code masks, it is possible to find some set of time offsets that produce a constant in the signal part of the result. However, for the convenience of the receiver as well as for optimal performance, it may be desirable to minimize the number of samples that are multiplied. Hence, it may be preferable to first select a set of time offsets, and then determine the long code masks that will produce the desired constant result. If the alternation period is 80 msec, FIG. 7A (not drawn to scale) shows an example of a set of time offsets that might be used:

A sample (sample 1) at offset T1;

The complex conjugate of a sample (sample 2) at offset 32,768+T1+X=T2, where X is an arbitrarily (random) chosen integer between 1 and 32,767;

A sample (sample 3) at offset 3*32,768+T1+X=T3 (i.e., 80 msec after the first sample); and The complex conjugate of a sample (sample 4) at offset 4*32,768+T1=T4.

In this example, the offsets are chosen so that T1, T2, T3 and T4 all come from distinct repetitions of the short codes. This ensures that the solution is nontrivial, i.e., that the long code masks in the two 80 msec intervals do not simply repeat the long code PN sequence. The offsets are also chosen to maximize the part of the 80 msec intervals over which the desired long code property holds. Other ways of choosing the locations of the samples are possible, but as the time between samples increases, the result may be degraded by time and phase drift between the transmitter and receiver.

Samples 1 and 4 contain the same short code values, as do samples 2 and 3. Hence, multiplying one of these samples by the complex conjugate of the other eliminates the short code and leaves only the product of the long code values for those samples. The product of all four samples is then the product of the long code values for the four samples.

It is desirable to find two long code masks: one long code mask used from offset 0 (relative to an 80 msec boundary) to 3*32,768−1, and the other long code mask from 3*32,768 to 6*32,768−1, such that the product of the four bits is constant over the period from 0 to 2*32,768−X. This problem may be solved by linear matrix operations.

Let $R_0$ be a 42-bit vector containing the state of the long code register ("state" indicates values of the 42 stages in the feedback shift register) at the time of an 80 msec boundary. Let M, $M_{LC0}$ and $M_{LC1}$ be 42×42 Boolean matrices defined as:

M is a matrix that advances the state of the long code register by one chip, i.e., $R_{t+1}=MR_t$, and therefore $R_k=M^k R_0$, so $M^k$ is a matrix that advances the state of the long code register by k chips.

$M_{LC0}$ and $M_{LC1}$ are matrices that create the next 42 bits of the PN sequence generated by the long code masks LC0 and LC1, respectively, for a given long code state R.

In order for the signal part of the product of the four samples defined above to be constant for all T1 in the noted interval, $$M_{LC0}R \oplus M_{LC0}M^{T2}R \oplus M_{LC1}M^{T3}R \oplus M_{LC1}M^{T4}R = 0$$

where $\oplus$ is an XOR function. This equation is equivalent to:

$$M_{LC0}R \oplus M_{LC0}M^{T2}R = M_{LC1}M^{T3}R \oplus M_{LC1}M^{T4}R$$

By factoring the right side of the equation above, and recognizing that for a maximal length sequence this result must hold for all R, the unknown matrix $M_{LC1}$ may be defined as:

$$M_{LC1} = M_{LC0}(I \oplus M^{T2})(M^{T3} \oplus M^{T4})^{-1}$$

where I is an identity matrix, which may be expressed as:

$$\begin{bmatrix} 1 & 0 & 0 & \ldots & 0 \\ 0 & 1 & 0 & \ldots & 0 \\ 0 & 0 & 1 & \ldots & 0 \\ \ldots \\ 0 & 0 & 0 & \ldots & 1 \end{bmatrix}$$

The first row of the $M_{LC1}$ matrix, which creates the first bit of the PN sequence generated by long code state R, is equal to the second desired long code mask. The first long code mask (the first row of $M_{LC0}$) may be any arbitrarily selected non-zero value, such as a function of a mobile station's ESN.

Thus, this process may be continued to create a chain of more than two long code masks having a similar property that the long code can be removed by a multiplicative process spanning the periods in which each pair of masks is used.

Alternative embodiments with more than two samples per 80 msec interval may be derived in a similar manner. Likewise, CDMA implementations may be developed in which the long code mask can be changed more or less frequently than 80 msec without changing the applicability of this method.

For example, suppose the samples immediately following the four samples noted above are also included, with complex conjugation when the original sample is not conjugated and vice versa. In this example, any phase drift in the channel or frequency error in the transmitter or receiver may also be minimized, since only the drift over one chip time remains in the result.

However, increasing the number of multiplicative terms may have a penalty in performance at low signal-to-noise ratios, since the noise terms in the result are also multiplied. This nonlinear operation typically causes a "threshold effect," as seen in FM broadcast receivers, where the signal-to-noise ratio in the product drops very rapidly when the received signal-to-noise ratio is below a threshold level. In practice, this may limit the usefulness of this technique to cases where the signal-to-noise ratio is near or above the threshold. Fortunately, the case where this technique is most needed is the case where cellular service is not available, and interference from regular CDMA phones would be much less. In situations where cellular service is available, the transmitter and receiver should have access to CDMA system time, and can use the same acquisition process used in base stations.

FIG. 7B is a flow chart corresponding to the method described above with FIG. 7A. In block 750, the method wirelessly receives a signal comprising a plurality of data samples spread by first, second, and third pseudorandom noise codes. In block 752, the method multiplies each first received data sample by a complex conjugate of a second received data sample, a third received data sample, and a complex conjugate of a fourth received data sample. The second received data sample is time offset from the first received data sample by a length of the second pseudorandom noise code plus an integer X. The third received data sample is time offset from the first received data sample by three multiplied by (the length of the second pseudorandom noise code) plus X. The fourth received data sample is time offset from the first received data sample by four multiplied by (the length of the second pseudorandom noise code). In block 754, the method may average the product of the first, second, third and fourth samples over a number of other products.

The aspects described herein may be applied to communication systems based on one or more standards, such as IS-95, CDMA 2000, CDMA 1×EV-DO (Evolution Data Optimized), or any spread spectrum communication system in which a long code is used and a short code can be removed by waiting for one or more periods.

The methods described herein may be extended to more complex linear spreading. For example, the spreading methods used for the TIA-2000 reverse link, RC3 and RC4, utilize the long and short spreading codes in a more complex manner than in RC1 and RC2. In RC3 and RC4, the spreading has been explicitly designed so that the spreading on consecutive complex modulation chips changes by exactly +/−90 degrees. Thus, the product of the complex spreading factor for one chip and the complex conjugate of the spreading factor for the subsequent chip depends only on the difference in phase angle, hence is always an imaginary number. Further, this product does not depend on any phase offset introduced within the channel. This reduces the received reverse link pilot signal to a single imaginary number whose sign depends only on the exclusive-OR of a few consecutive chips of the long code and short code. Since the exclusive-OR of multiple chips from a maximal-length PN sequence results in the same PN sequence with a known, fixed time delay, the methods of this specification can be used to produce long code sequences for which the complex product described above has the same correlation properties over successive 80-msec intervals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The actions of a method or algorithm described in connection with the embodiments disclosed herein may be embodied directly in hardware, in a software module executed by a processor, or in a combination of the two. A software module may reside in random access memory (RAM), flash memory, read-only memory (ROM), electrically programmable ROM (EPROM), electrically erasable PROM (EEPROM), registers, hard disk, a removable disk, a compact disc-ROM (CD-ROM), or any other form of storage medium known in the art. A storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present application. Various modifications to these embodiments will be readily apparent to those skilled in the art, and the generic principles defined herein may be applied to other embodiments without departing from the spirit or scope of the application. Thus, the present application is not intended to be limited to the embodiments shown herein but is to be accorded the widest scope consistent with the principles and novel features disclosed herein.

What is claimed is:

1. An apparatus comprising:
a selector to sequentially select a first mask and a second mask, each mask comprising a finite sequence of binary bits;
a generator to receive the first mask, generate a first pseudorandom noise code, receive the second mask and generate a second pseudorandom noise code;
a first multiplier to sequentially multiply the first and second pseudorandom noise codes with data to form a signal;
a transmitter to wirelessly transmit the signal,
wherein the selector is configured to select the first mask for a period of 80 milliseconds, then selects the second mask for a period of 80 milliseconds, and repeats.

2. An apparatus comprising:
a selector to sequentially select a first mask and a second mask, each mask comprising a finite sequence of binary bits;
a generator to receive the first mask, generate a first pseudorandom noise code, receive the second mask and generate a second pseudorandom noise code;
a first multiplier to sequentially multiply the first and second pseudorandom noise codes with data to form a signal;
a transmitter to wirelessly transmit the signal,
wherein the selector is configured to select the first mask for a period of 80 milliseconds, then selects the second mask for a period of 80 milliseconds, then selects a third mask for a period of 80 milliseconds.

3. An apparatus comprising:
a selector to sequentially select a first mask and a second mask, each mask comprising a finite sequence of binary bits;
a generator to receive the first mask, generate a first pseudorandom noise code, receive the second mask and generate a second pseudorandom noise code;
a first multiplier to sequentially multiply the first and second pseudorandom noise codes with data to form a signal;
a transmitter to wirelessly transmit the signal,
wherein the generator comprises a linear feedback shift register, a plurality of AND gates, and a plurality of exclusive-OR gates.
wherein the first and second pseudorandom noise codes each have a length of $2^L-1$, where L is equal to a number of stages in the linear feedback shift register;
wherein L is greater than 40.

4. An apparatus comprising:
a selector to sequentially select a first mask and a second mask, each mask comprising a finite sequence of binary bits;
a generator to receive the first mask, generate a first pseudorandom noise code, receive the second mask and generate a second pseudorandom noise code;

a first multiplier to sequentially multiply the first and second pseudorandom noise codes with data to form a signal;

a transmitter to wirelessly transmit the signal, wherein the generator comprises a linear feedback shift register, a plurality of AND gates, and a plurality of exclusive-OR gates.

wherein the second mask is a function of the first mask, wherein the second mask is equal to a first row of a Boolean matrix $M_{LC1}$ represented by:

$$M_{LC1} = M_{LC0}(I \oplus M^{T2})(M^{T3} \oplus M^{T4})^{-1}$$

where $M_{LC0}$ and $M_{LC1}$ are matrices that create next N bits of a pseudorandom noise sequence generated by the first and second masks for a given state R of the linear feedback shift register;

where I is an identity matrix;

where $\oplus$ is an XOR function;

where $M^{T2}$ is a matrix that advances the state of the linear feedback shift register by T2 chips, where T2 is equal to a length of a third pseudorandom noise code plus an integer X;

where $M^{T3}$ is a matrix that advances the state of the linear feedback shift register by T3 chips, where T3 is equal to three multiplied by the length of the third pseudorandom noise code plus X; and where $M^{T4}$ is a matrix that advances the state of the linear feedback shift register by T4 chips, where T4 is equal to four multiplied by the length of the third pseudorandom noise code.

5. An apparatus comprising:

a receiver to wirelessly receive a signal comprising a plurality of data samples spread by first, second, and third pseudorandom noise codes; and a multiplier to multiply each first received data sample by a complex conjugate of a second received data sample, a third received data sample and a complex conjugate of fourth received data sample, the second received data sample being time offset from the first received data sample by a length of the third pseudorandom noise code plus an integer X, the third received data sample being time offset from the first received data sample by three multiplied by the length of the third pseudorandom noise code plus integer X, the fourth received data sample being time offset from the first received data sample by four multiplied by the length of the third pseudorandom noise code.

6. The apparatus of claim 5, further comprising an element to average a product of the first, second, third and fourth samples over a plurality of other data samples.

7. An apparatus comprising:

a receiving means to wirelessly receive a signal comprising a plurality of data samples spread by first, second, and third pseudorandom noise codes; and a multiplying means to multiply each first received data sample by a complex conjugate of a second received data sample, a third received data sample and a complex conjugate of a fourth received data sample, the second received data sample being time offset from the first received data sample by a length of the third pseudorandom noise code plus an integer X, the third received data sample being time offset from the first received data sample by three multiplied by the length of the third pseudorandom noise code plus integer X, the fourth received data sample being time offset from the first received data sample by four multiplied by the length of the third pseudorandom noise code.

8. A method comprising:

sequentially selecting a first mask and a second mask, each mask comprising a finite sequence of binary bits;

generating a first pseudorandom noise code based on the first mask;

generating a second pseudorandom noise code based on the second mask;

sequentially multiplying the first and second pseudorandom noise codes with data to form a signal;

wirelessly transmitting the signal;

wherein the second mask is equal to a first row of a Boolean matrix $M_{LC1}$ represented by:

$$M_{LC1} = M_{LC0}(I \oplus M^{T2})(M^{T3} \oplus M^{T4})^{-1}$$

where $M_{LC0}$ and $M_{LC1}$ are matrices that create next N bits of a pseudorandom noise sequence generated by the first and second masks for a given state R of the linear feedback shift register;

where I is an identity matrix;

where $\oplus$ is an XOR function;

where $M^{T2}$ is a matrix that advances the state of the linear feedback shift register by T2 chips, where T2 is equal to a length of a third pseudorandom noise code plus an integer X;

where $M^{T3}$ is a matrix that advances the state of the linear feedback shift register by T3 chips, where T3 is equal to three multiplied by the length of the third pseudorandom noise code plus X; and where $M^{T4}$ is a matrix that advances the state of the linear feedback shift register by T4 chips, where T4 is equal to four multiplied by the length of the third pseudorandom noise code.

9. A method comprising:

wirelessly receiving a signal comprising a plurality of data samples spread by first, second, and third pseudorandom noise codes; and multiplying each first received data sample by a complex conjugate of a second received data sample, a third received data sample, and a complex conjugate of a fourth received data sample, the second received data sample being time offset from the first received data sample by a length of the third pseudorandom noise code plus an integer X, the third received data sample being time offset from the first received data sample by three multiplied by the length of the third pseudorandom noise code plus integer X, the fourth received data sample being time offset from the first received data sample by four multiplied by the length of the third pseudorandom noise code.

10. The method of claim 9, further comprising averaging a product of the first, second, third and fourth samples over a plurality of other data samples.

* * * * *